United States Patent
Facey et al.

(10) Patent No.: US 7,063,299 B2
(45) Date of Patent: Jun. 20, 2006

(54) SUSPENDING EQUIPMENT

(75) Inventors: Hugh David Facey, Sheffield (GB); Derek Boaler, Sheffield (GB); John Makin, Rotherham (GB)

(73) Assignee: Gripple Limited, Sheffield (GB)

( * ) Notice: Subject to any disclaimer, the term of this patent is extended or adjusted under 35 U.S.C. 154(b) by 0 days.

(21) Appl. No.: 10/227,103

(22) Filed: Aug. 23, 2002

(65) Prior Publication Data
US 2003/0062460 A1    Apr. 3, 2003

(30) Foreign Application Priority Data

Aug. 23, 2001  (GB)  ............................. 0120523.6
Nov. 1, 2001   (GB)  ............................. 0126179.1

(51) Int. Cl.
*F16G 11/14*   (2006.01)

(52) U.S. Cl. ........................... 248/328; 248/317

(58) Field of Classification Search ............. 248/328, 248/327, 329, 231.9, 320, 321, 317; 411/392
See application file for complete search history.

(56) References Cited

U.S. PATENT DOCUMENTS

| 1,271,383 A | * | 7/1918 | Street |
| 2,005,334 A | * | 6/1935 | Casper |
| 3,077,809 A | * | 2/1963 | Harding et al. ............... 411/33 |
| 4,556,184 A | * | 12/1985 | O'Sullivan ............... 248/330.1 |
| 4,709,922 A | * | 12/1987 | Slade, Jr. ..................... 272/123 |
| 5,513,923 A | | 5/1996 | Schoepke et al. |
| 5,582,447 A | * | 12/1996 | Leon et al. ............. 292/307 R |
| 5,738,466 A | * | 4/1998 | Ashmore et al. ........ 405/302.2 |
| 6,003,210 A | * | 12/1999 | Facey et al. .................. 24/130 |
| 6,053,457 A | * | 4/2000 | Ozga et al. .................... 248/58 |
| 6,058,574 A | * | 5/2000 | Facey et al. .............. 24/136 R |

FOREIGN PATENT DOCUMENTS

| EP | 0926393 | 8/1998 |
| GB | 2298436 | 9/1996 |
| JP | 9-151996 | * 10/1997 |
| JP | 11-201237 | * 7/1999 |
| JP | 00303612 | 10/2000 |

* cited by examiner

*Primary Examiner*—Anita M. King
(74) *Attorney, Agent, or Firm*—Trexler, Bushnell, Giangiorgi, Blackstone & Marr, Ltd

(57) ABSTRACT

A mechanism for suspending equipment from an overhead structural member includes a suspension strand, e.g. of wire or wire rope, provided at one end with a screwthreaded portion, together with a locking device having in bores each preferably associated with a wedging mechanism which prevents withdrawal of the free end of the strand in the opposite direction to insertion. The screwthreaded portion may be screwed into the overhead structural member, or into the equipment, the free end of the strand passed through one bore of the locking device, through an eye on the equipment or round the equipment, or through an eye on the overhead structural member or round the overhead structural member, then back through the other bore of the locking device to be secured therein by the wedging mechanism.

7 Claims, 3 Drawing Sheets

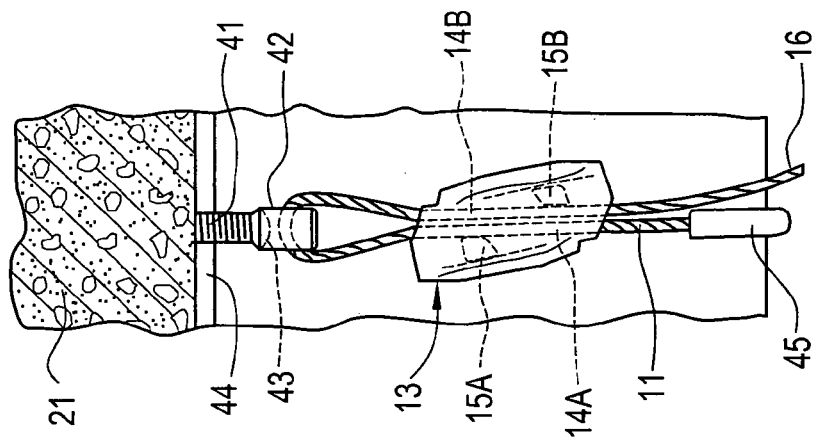
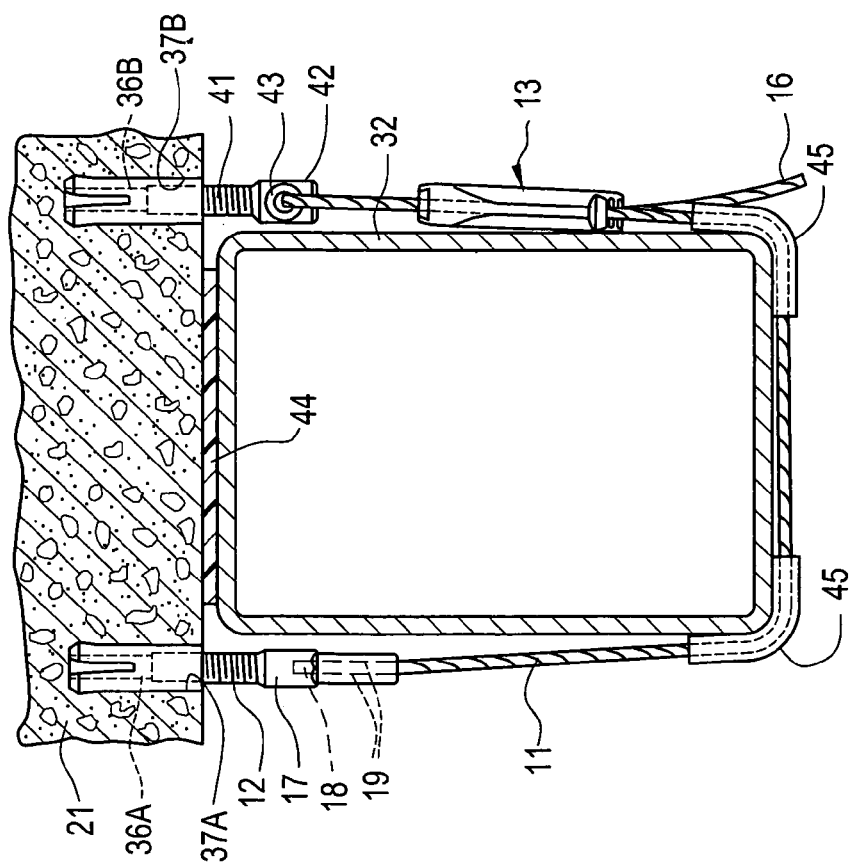

SUSPENDING EQUIPMENT

This application claims priority with respect to British Application No. 0120523.6, filed Aug. 23, 2001, and British Application No. 0126179.1, flied Nov. 1, 2001.

This invention relates to means for and methods of suspending equipment (such as lighting, heating, trunking or ventilation units) from an overhead structural member (such as a roof, ceiling, beam or girder).

According to one aspect of the present invention, means for suspending equipment from an overhead structural member comprises a suspension strand provided at one end with a screwthreaded portion, together with a locking device having twin bores at least one of which is associated with wedging means (e.g. a ball, roller or wedge) preventing withdrawal of the free end of the suspension strand (i.e. the end remote from the screwthreaded portion) in the opposite direction to insertion.

Thus, in one method of suspending equipment from an overhead structural member in accordance with the invention, the screwthreaded portion on the suspension strand is screwed into a screwthreaded hole provided in the overhead structural member, or secured in a plain hole in part of the member, e.g. a flange, by a nut on each side of the hole, the free end of the strand is passed through one bore of the locking device, then through an eye provided on the equipment or passed round the equipment, and through the other bore of the locking device wherein the strand is secured by the wedging means.

In another method in accordance with the invention, the screwthreaded portion on the suspension strand is screwed into a screwthreaded hole in the equipment to be suspended, or a supporting member therefor, or secured in a plain hole in part of the equipment or supporting member, e.g. flange, by a nut on each side of the hole, the free end of the strand is passed through one bore of the locking device, then through an eye provided on the overhead structural member or passed over the member, and through the other bore of the locking device wherein the strand is secured by the wedging means.

With either method, the level at which the equipment is suspended can be adjusted upwards by pulling the locking device upwards or downwards, as the case may be by pulling the free end of the suspension strand further through the locking device, which may be provided with temporary release means for its wedging means to enable the level at which the equipment is suspended to be adjusted downwards.

The suspension strand may be a length of wire or wire rope, or of any other suitable material, and the screwthreaded portion on one end is part of a member the other part of which is a socket in which the end of the strand is secured by swaging the socket. The member having the screwthreaded portion and the socket is preferably provided with a non-circular formation to which can be applied a wrench or spanner for facilitating screwing into the screwthreaded hole in the overhead structural member on the equipment, and which non-circular formation may be formed by a plurality of flats (e.g. six) made by a swaging tool.

Each bore of the locking device may be associated with wedging means, so that the locking device can be used either way up.

The screwthreaded hole in an overhead structural member may be provided by a dropin anchor driven into a hole bored in the member; thus an equipment suspension kit may comprise a drop-in anchor in addition to a suspension strand with screwthreaded portion and a locking device with twin bores and wedging means as described above. Alternatively, or in addition, an equipment suspension kit may be provided with an eyebolt or similar for securing to an overhead structural member or the equipment to be suspended, as the case may be.

According to another aspect of the present invention, a method of suspending equipment from an overhead structural member, such as a concrete beam or ceiling, comprises driving into the overhead member a pair of drop-in anchors spaced apart, providing a suspension strand with a screwthreaded portion at one end, screwing the screwthreaded portion on the strand into one of the drop-in anchors, screwing into the other drop-in anchor a bolt having a head with a lateral hole, passing the free end of the suspension strand round the equipment to be suspended, then through one bore of a locking device of the type having twin bores at least one of which is associated with wedging means preventing withdrawal in the opposite direction to insertion, next passing the free end of the suspension strand through the lateral hole in the bolt, passing the free end of the suspension strand through the other bore of the aforesaid device, and finally pulling the free end of the suspension strand through the locking device and the lateral hole in the bolt until the equipment is secured in contact with the overhead member. For use with equipment having a square or rectangular cross-section the drop-in anchors are preferably spaced apart by more than the width of the equipment, so that the equipment can be secured with its upper side in full contact with the overhead member. A pad or strip of insulating material may be provided between the equipment and the overhead structural member.

Thus another equipment suspension kit may comprise a pair of drop-in anchors, a suspension strand with a screwthreaded portion at one end for screwing into one drop-in anchor, a bolt with a lateral hole in a head portion for screwing into the other drop-in anchor, and a locking device for the suspension strand of the type having twin bores at least one of which is associated with wedging means preventing withdrawal of the suspension strand in the opposite direction to insertion.

Alternatively, or in addition, a pair or pairs of nuts may be provided for use in securing the or each screwthreaded portion in a plain hole, as described above.

Any equipment suspension kit in accordance with the invention may include plastics sleeving for slipping any over part of the suspension strand expected to contact the equipment to be suspended, e.g. to minimise vibration or noise; and a tensioning tool, such as a blind rivetting tool, may be included for tensioning the suspension strand by application of the tool to the free end of the suspension strand after it has passed through the second bore of the locking device.

Embodiments of the invention will now be described, by way of example only, with reference to the accompanying drawings, in which.

Figure 3:
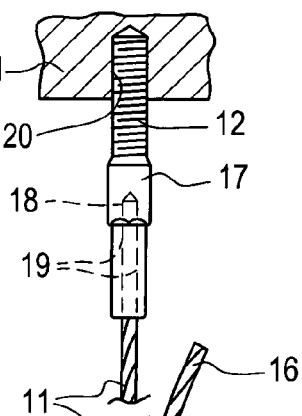
FIG. 3 is a part-sectional elevation showing the suspension strand of FIG. 1 and the locking device of FIG. 2 in use for suspending equipment from an overhead structural member.
Figure 4:
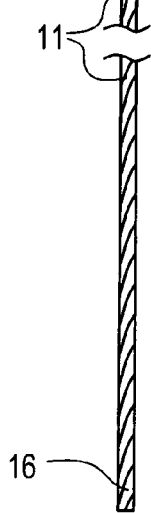
Figure 5:
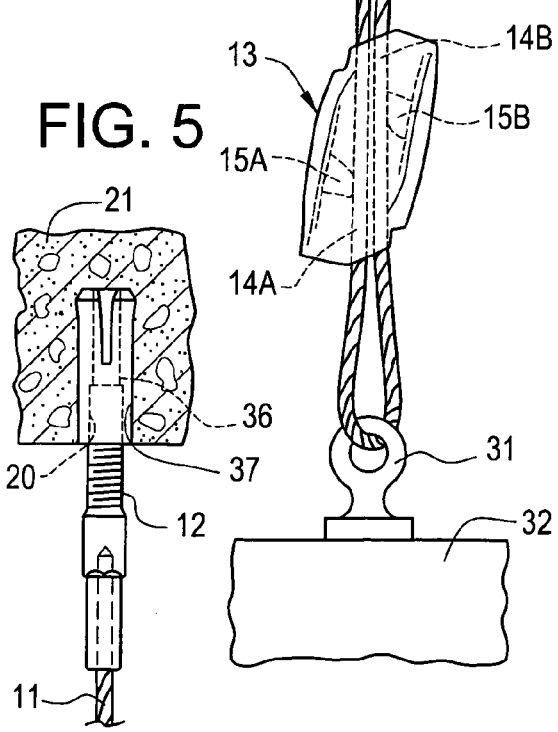
Figure 7:
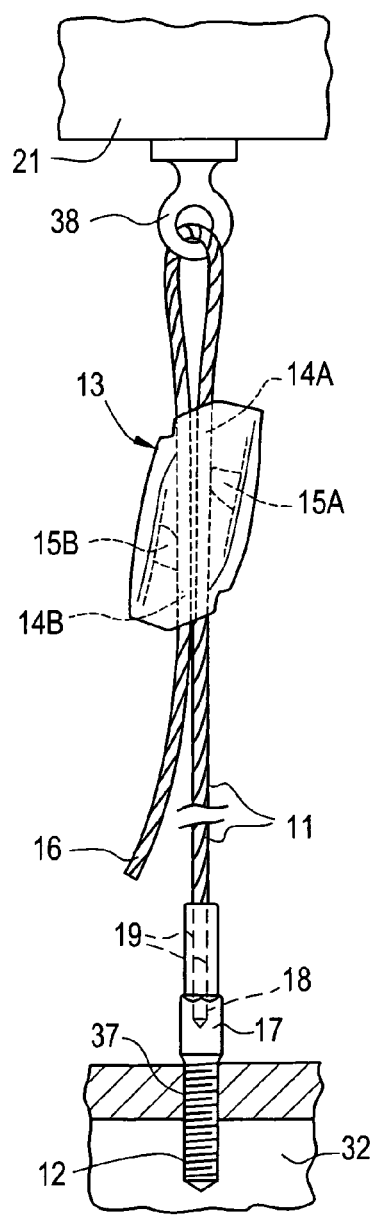
Figure 6:
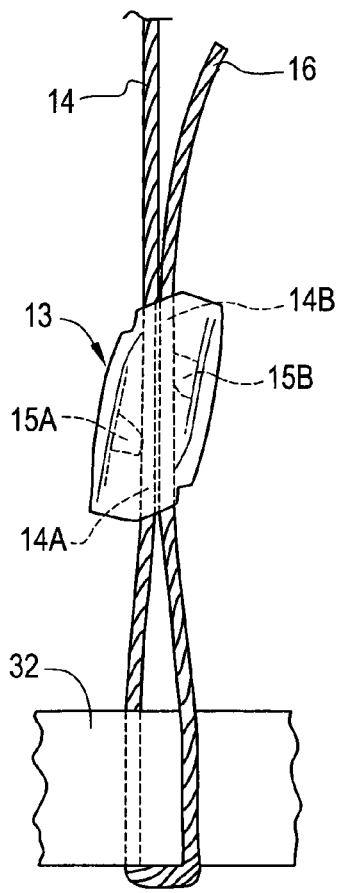
Figure 8:
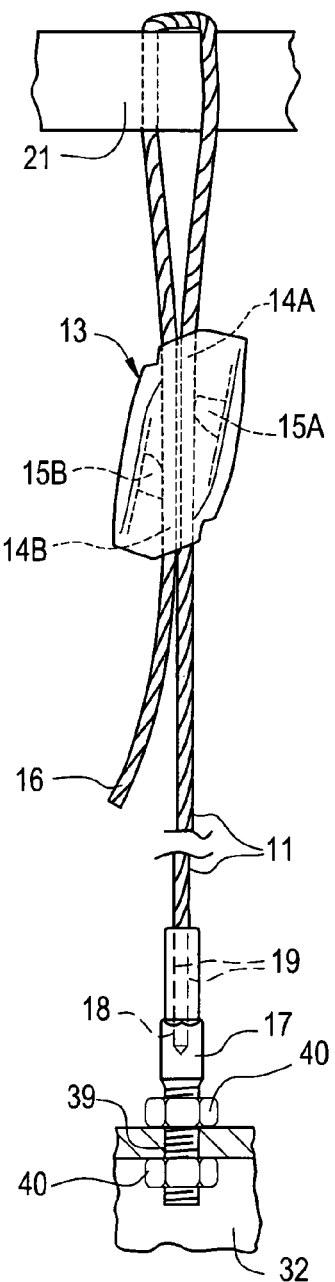

FIG. 4 corresponds to the upper end of FIG. 3 but shows an alternative way of fixing the suspension strand to an overhead structural member;

FIG. 5 corresponds to FIG. 4 but shows a way of fixing the suspension strand to an overhead structural member made of concrete;

FIG. 6 corresponds to the lower end of FIG. 3 but shows an alternative way of using the suspension strand to suspend equipment;

FIG. 7 corresponds to FIG. 3 but shows the suspension means disposed the other way up;

FIG. 8 corresponds to FIG. 7 but shows alternative ways of securing the suspension strand to the equipment and the overhead structural member;

FIG. 9 Is a section through an item of equipment suspended from but secured up against an overhead structural member made of concrete by another method in accordance with the invention, and FIG. 10 is a view of the right hand side of FIG. 9.

Figure 1:
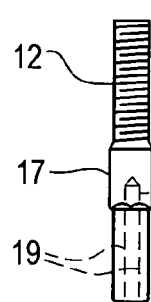
FIG. 1 is a side elevation of a suspension strand provided at one end with a screwthreaded portion for use as part of means in accordance with the invention for suspending equipment from an overhead structural member as will be described with reference to FIGS. 3 to 10.
Figure 2:
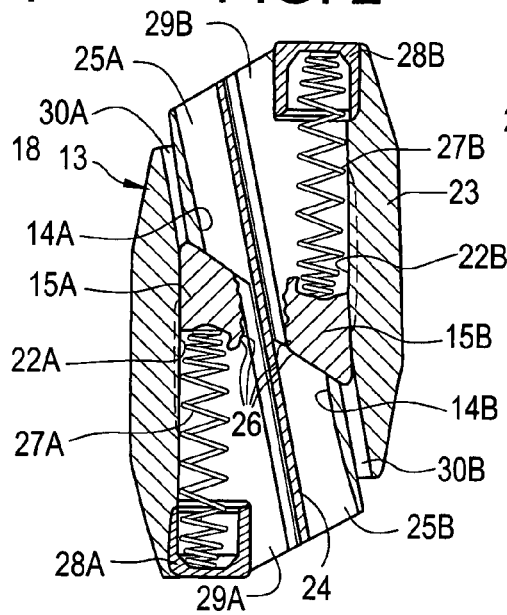
FIG. 2 is a longitudinal section through a locking device forming the other part of the means for suspending equipment from an overhead structural member.

The means for suspending equipment shown in FIGS. 1 and 2 comprise a suspension strand 11 provided at one end with a screwthreaded portion 12, and a locking device 13 having twin bores 14A, 14B each associated with wedging means 15A, 15B preventing withdrawal of the free end 16 of the suspension strand in the opposite direction to insertion.

The suspension strand 11 is a length of wire rope, and the screwthreaded portion is part of a member 17 the other part of which is a socket 18 in which the end of the strand is secured by swaging the socket. A non-circular formation on the member 17 is formed by a plurality of flats 19 made by a swaging tool (not shown), to which flats can be applied a wrench or spanner (not shown) for facilitating screwing into, e.g. a screwthreaded hole 20 in an overhead structural member 21, as in FIG. 3.

The wedging means 15A, 15B comprise wedges slidable along respective channels 22A, 22B in the body 23 of the locking device 13, each channel converging at an acute angle to and into communication with a respective one of the twin bores 14A, 14B (which are separated by a thin wall 24) towards an inlet end 25A, 25B of that respective bore, the wedges 15A, 15B being provided with transverse ribs 26 (or teeth or other surface formations) for gripping engagement with the strand 11 (when inserted) under the urge of compression springs 27A, 27B between the wedges and recessed abutments 28A, 28B adjacent outlet ends 29A, 29B of the respective bores 14A, 14B. Apertures 30A, 30B in the body 23 of the locking device 13 each have an inner end opening into a respective channel 22A and 22B and each is available as a guide for a separate tool (not shown) such as a pin or drift pushed into the channel to move the respective wedge 15A, 15B against the urge of its spring to enable the strand 11 to be freed for adjustment of the position of the locking device with respect to the strand.

Referring again to FIG. 3, the free end 16 of the strand 11 is passed through one bore 14A of the locking device 13, then through an eye 31 provided on equipment 32 to be suspended, and through the other bore 14B of the locking device wherein the strand is secured by the wedge 15B. The level at which the equipment is suspended can be adjusted upwards by pulling the locking device 13 upwards or by pulling the free end 16 of the suspension strand 11 further through the locking device; or the level may be adjusted downwards by temporarily releasing the wedge 15B by inserting a pin or drift into the aperture 30B to push the wedge against its spring urge out of engagement with the strand.

In FIG. 4, the screwthreaded portion 12 is secured in a plain hole 33 in a flange 34 of an overhead structural member 21 by nuts 35 one to each side of the hole, or, as shown in FIG. 5, the screwthreaded hole 20 in the overhead structural member 21 may be provided by a drop-in anchor 36 driven into a hole 37 bored in the member.

In FIG. 6 the strand 11 is shown passing round the equipment 32 or a support for the equipment, and the manner of adjustment of the position of the equipment is as described in relation to FIG. 3.

In FIG. 7, the screwthreaded portion 12 on the strand 11 is shown screwed into a screwthreaded hole 37 in the equipment 32 to be suspended, the free end 16 of the strand is passed through one bore 14A of the locking device 13, then through an eye 38 provided on the overhead structural member 21, and through the other bore 14B of the locking device wherein the strand is secured by the wedge 15B. The level at which the equipment is suspended can be adjusted upwards by pulling the locking device downwards or by pulling the free end 16 of the strand 11 further through the locking device; or the level may be adjusted downwards by temporarily releasing the wedge 15B in the manner described in relation to FIG. 3.

In FIG. 8, the screwthreaded portion 12 on the strand 11 is shown secured in a plain hole 39 in the equipment 32 by nuts 40 one to each side of the hole, and the strand is shown passing over the overhead structural member 21, adjustment of the level of the suspended equipment again being as described in relation to FIG. 7.

In FIGS. 9 and 10, a pair of drop-in anchors 36A, 36B are driven into bores 37A, 37B spaced apart in a concrete overhead structural member 21 (e.g. a beam or ceiling) by more than the width of equipment 32 (e.g. ventilation ducting), the screwthreaded portion 12 of a suspension strand 11 is screwed into the drop-in anchor 36A and a bolt 41 having a head 42 with a lateral hole 43 is screwed into the drop-in anchor 36B, the free end 16 of the strand is passed round the equipment, then through one bore 14A of a locking device 13, next through the lateral hole 43 in the bolt 41 and through the other bore 14B of the locking device, and, finally, the free end 16 of the strand 11 is pulled through the locking device and the lateral hole in the bolt until the equipment 32 is secured close up against the overhead member 21, either in contact therewith, or separated therefrom by a pad or strip 44 of insulating material. Lengths of plastics sleeving 45 are shown slipped over parts of the strand contacting the lower corners of the equipment 32, e.g. to minimise vibration or noise.

For use with metal overhead structural members the screwthreaded portion 12 on the strand 11 and the bolt 41 may each be screwed into a screwthreaded hole, as illustrated in FIG. 3, or each may be secured in a plain hole by a pair of nuts, as illustrated in FIG. 4.

The invention claimed is:

1. A method of suspending equipment from an overhead structural member comprising driving into the overhead member a pair of drop-in anchors spaced apart, providing a suspension strand with a screwthreaded portion at one end, screwing the screwthreaded portion on the strand into one of the drop-in anchors, screwing into the other drop-in anchor a bolt having a head with a lateral hole, passing the free end of the suspension strand round the equipment to be suspended, then through one bore of a locking device of the type having twin bores at least one of which is associated with wedging means preventing withdrawal in the opposite direction to insertion, next passing the free end of the suspension strand through the lateral hole in the bolt passing the free end of the suspension strand through the other bore of the aforesaid device, and finally pulling the free end of the suspension strand through the locking device and the lateral hole in the bolt until the equipment is secured in contact with the overhead member.

2. A method as in claim 1, wherein for use with equipment having a square or rectangular cross-section the drop-in anchors are spaced apart by more than the width of the equipment, so that the equipment can be secured with the upper side in full contact with the overhead member.

3. A method as in claim 1 or claim 2, wherein a pad or strip of insulating material is provided between the equipment and the overhead structural member.

4. An equipment suspension kit comprising a pair of drop-in anchors, a suspension strand with a screwthreaded portion at one end for screwing into one drop-in anchor, a bolt with a lateral hole in a head portion for screwing into the other drop-in anchor, and a locking device for the suspension strand having twin bores at least one of which is associated with wedging means preventing withdrawal of the suspension strand in the opposite direction to insertion.

5. A kit as in claim 4, wherein each bore of the locking device is associated with wedging means, so that the locking device can be used either way up.

6. A kit as in claim 4 or claim 5, wherein a pair or pairs of nuts is provided for alternative use in securing the screwthreaded portion of the suspension strand and the bolt in plain holes in an overhead structural member.

7. A kit as in claim 4 or claim 5, including plastics sleeving or slipping any over part of the suspension strand expected to contact the equipment to be suspended.

* * * * *